US012626244B2

(12) United States Patent
Lemieux

(10) Patent No.: US 12,626,244 B2
(45) Date of Patent: May 12, 2026

(54) LOCATION-BASED NON-FUNGIBLE TOKEN DISTRIBUTION AND VERIFICATION

(71) Applicant: Dapper Labs, Inc., Vancouver (CA)

(72) Inventor: Nicholas Lemieux, Vancouver (CA)

(73) Assignee: Dapper Labs, Inc., Vancouver (CA)

( * ) Notice: Subject to any disclaimer, the term of this patent is extended or adjusted under 35 U.S.C. 154(b) by 236 days.

(21) Appl. No.: 18/299,747

(22) Filed: Apr. 13, 2023

(65) Prior Publication Data

US 2024/0346486 A1 Oct. 17, 2024

(51) Int. Cl.
G06Q 20/10 (2012.01)
G06Q 20/02 (2012.01)
G06Q 20/36 (2012.01)
G06Q 20/40 (2012.01)
G06Q 30/06 (2023.01)

(52) U.S. Cl.
CPC ......... G06Q 20/3672 (2013.01); G06Q 20/10 (2013.01); G06Q 20/4015 (2020.05); *G06Q 2220/00* (2013.01)

(58) Field of Classification Search
CPC .............. G06Q 20/3672; G06Q 20/10; G06Q 20/4015; G06Q 2220/00; G06Q 20/02; G06Q 20/123; G06Q 30/0607; G06Q 20/3224; G06Q 30/06
See application file for complete search history.

(56) References Cited

U.S. PATENT DOCUMENTS

| | | | | | |
|---|---|---|---|---|---|
| 12,155,532 | B1 * | 11/2024 | Garcarz | ................. | H04L 41/16 |
| 2013/0159541 | A1 * | 6/2013 | Yu | ....................... | H04L 41/0803 |
| | | | | | 709/229 |
| 2017/0048668 | A1 * | 2/2017 | Lee | ........................ | H04W 4/025 |
| 2020/0014697 | A1 * | 1/2020 | Karin | ...................... | G06N 20/00 |
| 2022/0406419 | A1 * | 12/2022 | Kruger | ................... | G16H 10/60 |
| 2023/0094849 | A1 * | 3/2023 | Kulasooriya | ...... | G06Q 30/0239 |
| | | | | | 726/26 |
| 2023/0114235 | A1 * | 4/2023 | Eivy | ..................... | G06T 19/006 |
| | | | | | 705/66 |
| 2023/0195855 | A1 * | 6/2023 | Mavromatis | ............ | G06F 21/10 |
| | | | | | 705/51 |
| 2024/0346504 | A1 * | 10/2024 | Rubinson | .............. | H04W 12/63 |
| 2025/0021954 | A1 * | 1/2025 | Genova, III | ........... | G06Q 30/02 |

* cited by examiner

*Primary Examiner* — Eduardo Castilho
*Assistant Examiner* — Karlyannie M. Garcia
(74) *Attorney, Agent, or Firm* — Potomac Law Group, PLLC; Dannon G. Allbee

(57) ABSTRACT

Aspects of the present disclosure are directed to providing location-based non-fungible tokens (NFTs) using request verification. Digital collectibles can be any suitable unit of data affiliated with person(s), organization(s), or any other entities. A digital collectible can comprise a display component that supports display of the digital collectible data. Some digital collectibles and/or NFTs can be generated as a set, such as digital collectibles linked to the same event (e.g., sporting events, concert, or other social event). Implementations support a set of location-based NFTs that correspond to digital collectibles linked to a predefined location, and in some examples a particular period of time (e.g., particular event) at the predefined location. For example, a claim manager can enforce a claim policy for the set of location-based NFTs, where user requests are validated against the claim policy before they are granted access to the set of location-based NFTs.

16 Claims, 9 Drawing Sheets

600

LOCATION-BASED NON-FUNGIBLE TOKEN DISTRIBUTION AND VERIFICATION

TECHNICAL FIELD

The present disclosure is directed to providing location-based non-fungible tokens (NFTs) using request verification.

BACKGROUND

A blockchain is a list of records, each called a block, which can be linked through cryptography. Each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains are very difficult to modify because data, once added to the blockchain, cannot be altered without altering all subsequent blocks.

Non-Fungible Tokens (NFTs), are blockchain-backed identifiers specifying a unique (digital or real-world) item. Through a distributed ledger, the ownership of these tokens can be tracked and verified. Such tokens can link to a representation of the unique item, e.g., via a traditional URL or a distributed file system such as IPFS. While a variety of blockchain systems support NFTs, common platforms that supports NFT exchange allow for the creation of unique and indivisible NFT tokens.

Traditionally, NFTs represent a way of being able to define ownership for practically anything that is digital. In other words, any material that can be digitized or which is already in a digital format can be the subject of an NFT. Some examples of NFT content can include digital photographs, video frames, social media interactions, and virtually all items that can be converted for receipt and processing by a computer (e.g., a scanned autograph). Asset ownership via digital items, such as NFTs, has grown in popularity. NFTs can include identifying information that identifies the asset tied to the NFT, such as unique identifying information, a web link, or other suitable identifying information. NFTs can be managed on a blockchain, thus providing transparency and reliability to the asset ownership.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
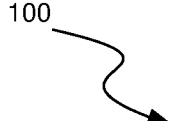
FIG. 1 is a block diagram illustrating an overview of devices on which some implementations can operate.
Figure 1:
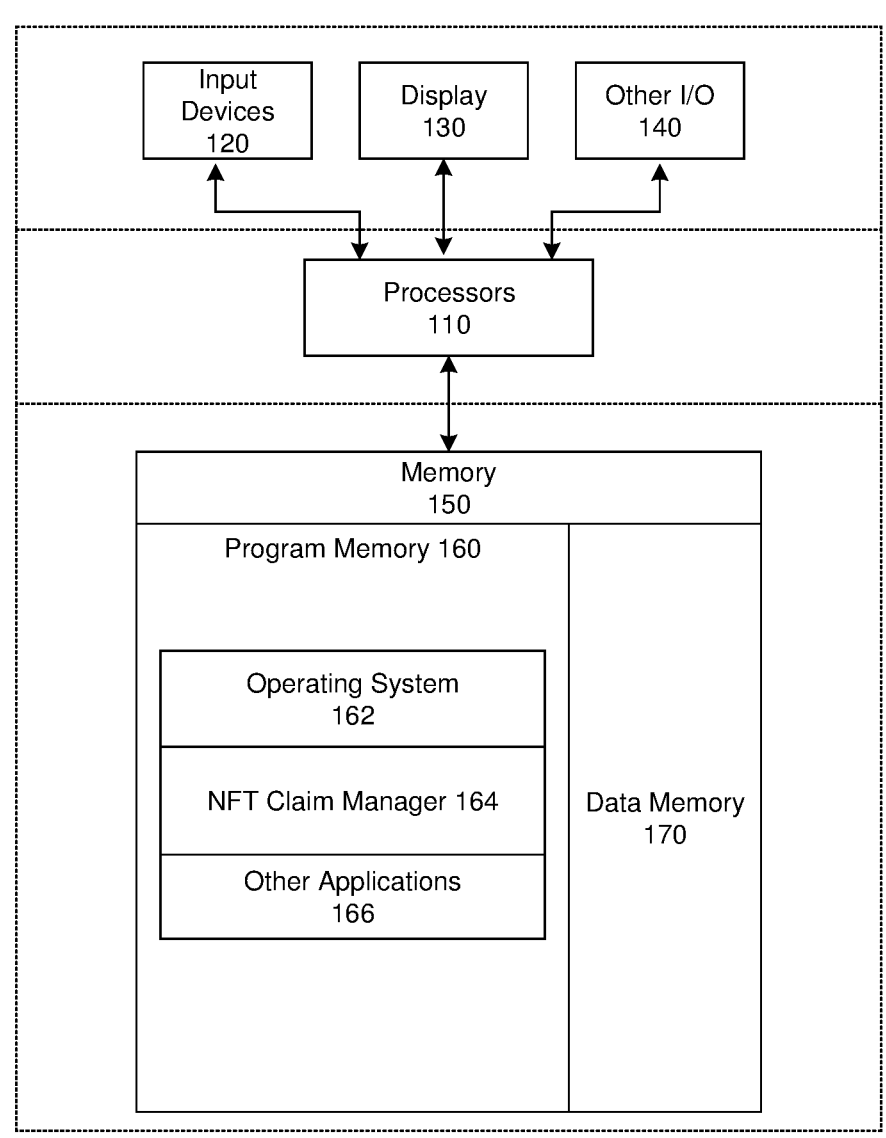

Aspects of the present disclosure are directed to providing location-based non-fungible tokens (NFTs) using request verification. NFTs are blockchain-backed identifiers specifying an item, such as a digital item. In some implementations, NFTs are linked to digital collectibles. Digital collectibles can be any suitable unit of data (e.g., data structure) affiliated with person(s), organization(s), or any other suitable entities. A digital collectible can comprise a display component that supports display of the digital collectible data. For example, digital collectible data can include an affiliated person (e.g., a sports player), an affiliated team (e.g., a sports team), a digital media file (e.g., video clip, image, etc.), or any other suitable digital collectible data. Some digital collectibles and/or NFTs can be generated as a set, such as digital collectibles linked to the same event (e.g., sporting events, concert, or other social event). Implementations support a set of location-based NFTs that correspond to digital collectibles linked to a predefined location, and in some examples a particular period of time (e.g., particular event) at the predefined location. For example, a claim manager can enforce a claim policy for the set of location-based NFTs, where user requests are validated against the claim policy before they are granted access to the set of location-based NFTs. The claim policy can define that granted user requests should originate from the predefined location affiliated with the set of location-based NFTs, and that the user requests are received/transmitted during an active time period for the set of location-based NFTs.

In some implementations, users can, using user client applications and user computing systems (e.g., portable devices) request, from an NFT service, one or more of a set of location-based NFT(s) affiliated with a predefined location. The predefined location can be any suitable location where people gather. For example, a set of location-based NFTs may be minted for a sports team with an event at a sporting venue. This set of location-based NFTs can be linked to digital collectibles affiliated with the particular sports team, sporting venue, and/or sporting event. For example, the linked digital collectibles can be affiliated with players that played during the particular sporting event, video clips that represent portions of the particular sporting event, teams participating at the particular sporting event, unique attributes of the particular sporting event (e.g., play-off game, theme of the game, etc.), aspects of the sporting venue, and/or other suitable aspects of the particular sporting event.

The claim manager and enforced claim policy can limit access to the set of location-based NFTs to users that are physically present at the predefined location during a certain time period (e.g., the active time period for the set of location-based NFTs). This claim policy can encourage social attendance at the predefined location during certain times, such as attendance at home team's basketball game located at the home team's sporting venue. Further, the set of location-based NFTs/digital collectibles can be linked to specific aspects of the predefined location and active time period (e.g., home team and game). The limited availability of the set of location-based NFTs can further encourage users to be in physical attendance at the predefined location. In the example where the predefined location and active time period represent a home basketball game, the limited availability of the set of location-based NFTs can encourage fans of the home team to physically attend the team's games. Further, the limited availability of the NFTs at the event can increase the desirability and value of the NFTs.

Users can transmit requests for one of the set of location-based NFTs from a number of different locations. The NFT service can verify the locations of users and/or the origination location of the users' requests and provide access to location-based NFTs that correspond to the verified locations of the users and/or users' request. For example, user requests the are verified to have originated from the predefined location during an active time period for the set of location-based NFTs can be granted access. In response to verified requests and user claims, the NFT service can, via execution of one or more smart contracts, transfer a predefined quantity (e.g., one, two, three, etc.) of the set of location-based NFTs to the users (e.g., user token wallets) affiliated with the verified requests.

In some implementations, the set of location-based NFTs/digital collectibles, after they are claimed by users, can be freely traded among a community of users. The location-based NFTs can be managed at one or more blockchain(s). For example, the blockchain(s) can store transactions such that ownership of the NFTs is maintained in a trusted manner. A transfer can comprise one or more smart contracts transferring an NFT with an NFT identifier from a seller token wallet to a buyer token wallet, and appending this transaction to the blockchain(s) that manage the NFT(s). Ownership of the digital collectible linked to the NFT is transferred from the seller affiliated with the seller token wallet to the buyer affiliated with the buyer token wallet.

Implementations provide a secure system that reliably limits access to a set of NFTs/digital collectibles. For example, traditional NFT providers do not place location and/or time policy restrictions on NFT purchases or claims. Implementations enforce both location and time restrictions on user claims for location-based NFTs. Because this policy is implemented in a trusted and reliable manner, users that comply with the policy and receive one or more of the set of location-based NFTs can rely on the limited availability of these NFTs/digital collectibles. Accordingly, users can perform transactions with these NFTs and/or demonstrate their enthusiasm for a team, player, or other entity linked to the NFTs/digital collectibles with the knowledge that these NFTs will continue to have a limited availability.

Several implementations are discussed below in more detail in reference to the figures. FIG. 1 is a block diagram illustrating an overview of devices on which some implementations of the disclosed technology can operate. The devices can comprise hardware components of a device 100 that provide location-based NFTs using request verification. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, NFT claim manager 164, and other application programs 166. Memory 150 can also include data memory 170, e.g., moment identifiers, portable device location data (e.g., GPS, location identifier, etc.), user login information, location verification information, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
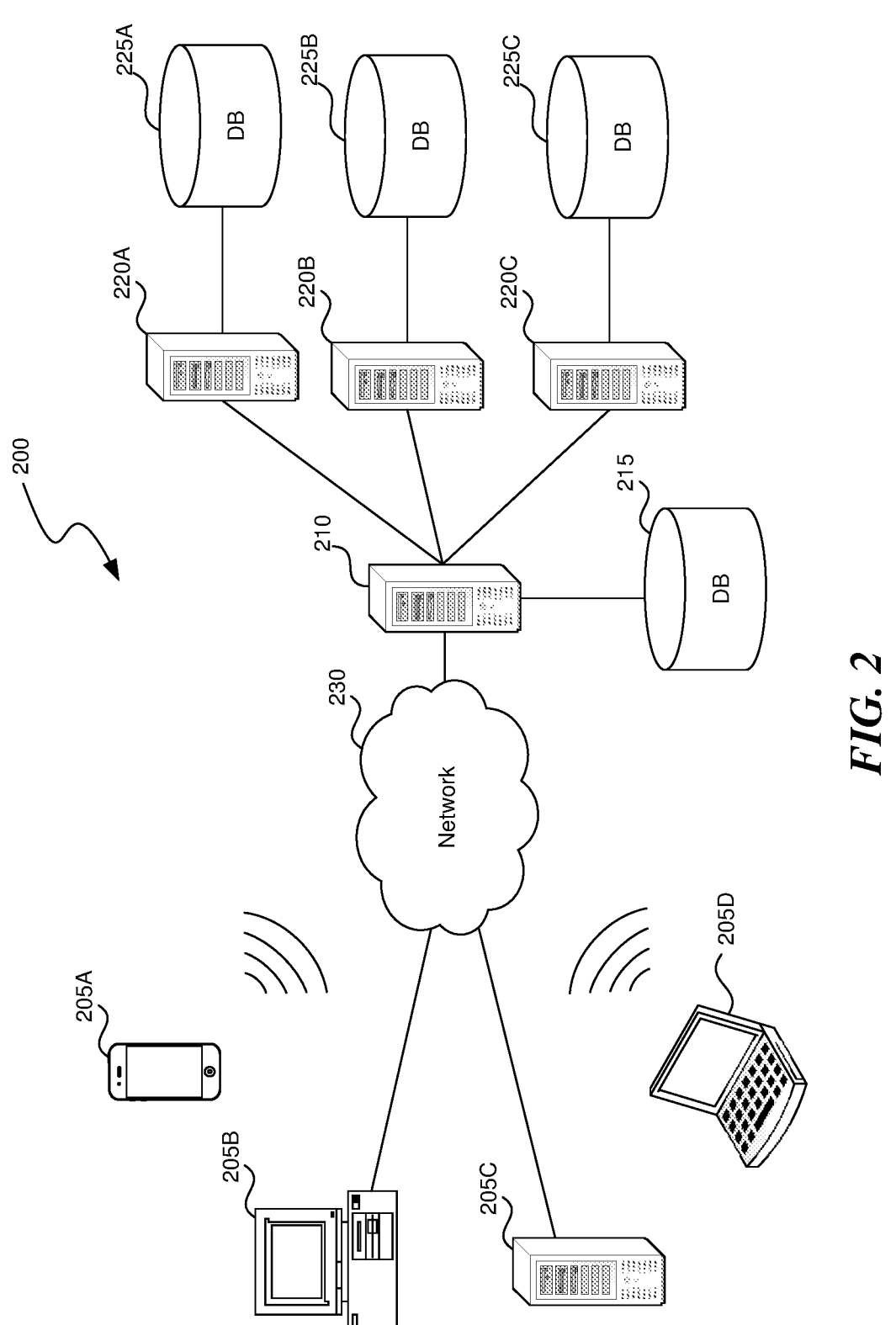
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as moment identifiers, portable device location data (e.g., GPS, location identifier, etc.), user login information, location verification information, and other suitable data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
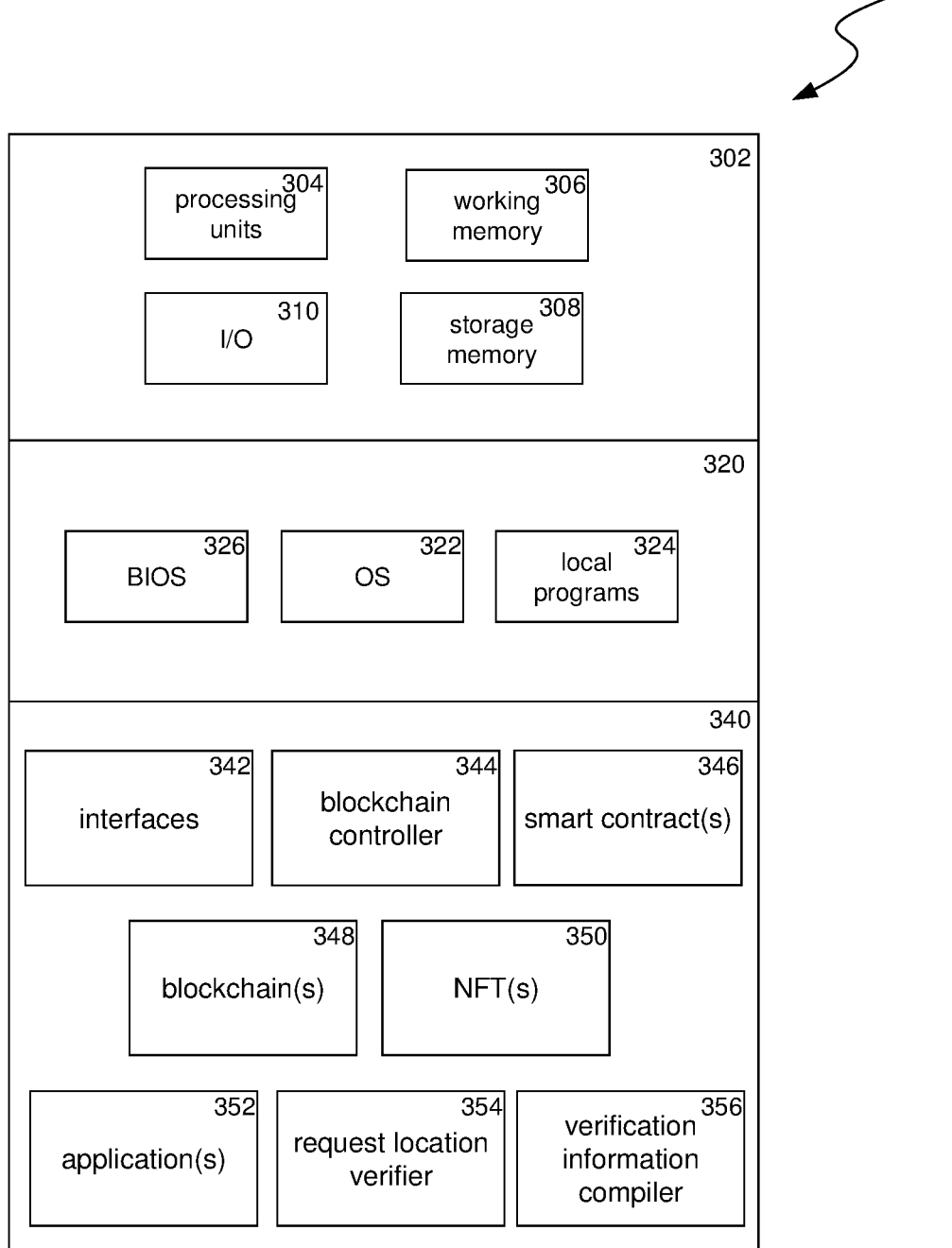
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include blockchain controller 344, smart contract(s) 346, blockchain(s) 348, NFT(s) 350, application(s) 352, and collection metric engine 354, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Blockchain controller 344 can be one or more software module(s) that manage blockchain(s) 348 via commands, for example using smart contract(s) 346. Blockchain controller 344 can issue calls using smart contract(s) 346 to append NFT transactions to blockchain(s) 348. For example, blockchain controller 344 can, via smart contract(s) 346, append NFT transaction(s) to blockchain(s) 348 that transfers ownership of an NFT from a first token wallet (e.g., owner user token wallet, originating token wallet, etc.) to a second token wallet (e.g., new owner user token wallet). Additional details on blockchain controller 344 are provided below in relation to blockchain service 404 of FIG. 4, process 700 of FIG. 7, and process 800 of FIG. 8.

Smart contract(s) 346 can be software logic that executes when a series of conditions are met. For example, a smart contract can be accessed via an application programming interface (API) that automatically executes when the conditions of the smart contract are met. The execution of smart contract(s) 346 manipulates blockchain(s) 348, such as by appending one or more blocks to blockchain(s) 348. In some implementations, the combination of the cryptographic data structure implemented by blockchain(s) 348, and the trustworthy software logic executed via smart contract(s) 346 achieves the trusted immutable ledger of transactions for NFT(s) 350 recorded by blockchain(s) 348.

In some implementations, smart contract(s) 346 include one or more location verification conditions. For example, smart contract(s) 346 and/or a user's token wallet can interact with a native application loaded to a user's portable device, a client application (e.g., web browser) that executes at the user's portable device and/or web application that interacts with the client application, location services that locate the user's portable device, request location verifier 354, or any other suitable source of the user's location information. A condition for execution of one or more of smart contract(s) 346, such as a smart-contract the provides the user access to one or more of a set of location-based NFTs, can include a verification that the user is/was located at predefined location(s) affiliated with the set of location-based NFTs. Additional details on smart contract(s) 346 are provided below in relation to blockchain service 404 of FIG. 4, process 700 of FIG. 7, and process 800 of FIG. 8.

Blockchain(s) 348 can maintain a distributed ledger for NFT(s) 350 that records ownership of NFT(s) 350. In some implementations, NFT(s) 350 comprise one or more data fields, and blockchain(s) 346 store the data field values of NFT(s) 350 as part of the distributed ledger. Blockchain controller 344 can maintain blockchain(s) 348 so that the blockchain(s) record an immutable ledger of transactions for NFT(s) 350 that can reliably prove the token wallet (e.g., user) that owns particular ones of NFT(s) 350. Blockchain(s) 348 can be distributed ledger(s) that store the ownership information for a set of NFTs, such as a set of location-based NFTs. The set of NFTs can be linked to digital collectibles. A digital collectible can be any suitable unit of data (e.g., data structure) that can be displayed via a display component. For example, a digital collectible can be displayed via a three-dimensional display component, two-dimensional display component, and/or any other suitable display component. Digital collectible 500 of FIG. 5 illustrates a three-dimensional digital collectible, however any other suitable digital collectible can be implemented. Additional details on blockchain(s) 348 are provided below in relation to blockchain service 404 of FIG. 4A, location-based NFT service 418 of FIG. 4B, process 700 of FIG. 7, and process 800 of FIG. 8.

In some implementations, NFT(s) 350 comprise one or more collections of NFTs affiliated with one or more organizations or individuals. For example, a given one of NFT(s) 350 can be linked to a particular digital collectible that comprises one or more features. For example, the particular digital collectible can be affiliated with a player and/or a team. The particular digital collectible can also be affiliated with a moment for the player, such as a digital media file (e.g., an image, video, or any other suitable media file). In this example, the given one of NFT(s) 350 represents ownership of the particular digital collectible to which it is linked. In some implementations, multiple NFT(s) 350 can be affiliated with a given player, and each of the multiple NFT(s) can be affiliated with a different moment for the player. In some implementations, NFT(s) 350 comprise semi-fungible tokens. Additional details on NFT(s) 350 are provided below in relation to blockchain service 404 of FIG. 4, digital collectible 500 of FIG. 5, process 700 of FIG. 7, and process 800 of FIG. 8.

Application(s) 352 can be software that performs logic related to digital collectibles and/or any other suitable media linked to NFT(s) 350. For example, applications(s) 352 can be any suitable web application (e.g., progressive web application, etc.), web technology, native application (e.g., React native), or other suitable software application. In some implementations, applications 352 can interact with a client applications (e.g., web browser, native application, etc.) to display web data to a user, such as web pages, images, videos, digital collectibles, or any other suitable web data. Application(s) 352 can execute at one or more cloud servers, one or more client systems (e.g., smartphones, laptops, tablets, smart devices, wearable systems, etc.), one or more edge servers, any combination thereof, or at any other suitable computing system.

In some implementations, a user can claim one or more NFT(s) 350, such as a location-based NFT, from an NFT source (e.g., NFT minter and/or originating token wallet) via application(s) 352. For example, the user can, using a portable device and user client application (e.g., browser, native application, etc.), submit a request for a location-based NFT. In response, request location verifier 354 can verify the user's location using location information from the submitted request and/or other suitable user location information. When the user location is verified as matching a predefined location for the set of location-based NFTs, the user can, using the portable device and the user client application, claim one or more location-based NFTs through interactions with application(s) 352. Additional details on application(s) 352 are provided below in relation to application(s) 352 of FIG. 4, digital collectible 500 of FIG. 5, diagram 600 of FIG. 6, process 700 of FIG. 7 and process 800 of FIG. 8.

Request location verifier 354 can verify location information from a request for a location-based NFT and/or location information from the requesting system. For example, the request for location-based NFT(s) can include network information, such as an internet protocol (IP) address, a media access control (MAC) address, Wi-Fi network identifier, etc. In another example, location information received from/accessed via the requesting system can comprise a list of Wi-Fi network identifiers that cover the requesting system, location-based service data (e.g., city and state, zip code, etc.) or any other suitable location information accessible from the requesting system. Request location verifier 354 can compare this location information to location criteria, such as criteria information compiled by verification information compiler, to determine whether the request originated form the predefined location and/or the requesting system is located in the predefined location. Additional details on request location verifier 354 are provided below in relation to request location verifier 354 of FIG. 4B, diagram 600 of FIG. 6, process 700 of FIG. 7 and process 800 of FIG. 8.

Verification information compiler 356 can compile criteria information used to verify that a request originated at a predefined location affiliated with location-based NFT(s) and/or a requesting system is located at the predefined location. Example criteria information includes: a list of Wi-Fi network identifiers that cover the predefined location; a list of network addresses (e.g., IP addresses, MAC addresses, etc.) affiliated with the predefined location; map data for the predefined location (e.g., GPS coordinates, city and state, zip code, etc.); and other suitable criteria information. Verification information compiler 356 can compile this criteria information from previously received requests for location-based NFT(s), historical data, or any other suitable source. Additional details on verification information compiler 356 are provided below in relation to verification information compiler 356 of FIG. 4B, diagram 600 of FIG. 6, process 700 of FIG. 7 and process 800 of FIG. 8.

In some implementations, blockchain controller 344, smart contract(s) 346, and blockchain(s) 348 can implement any suitable blockchain and/or NFT standard or architecture, such as Flow and Flow Token, Ethereum (e.g., ERC 721, etc.), or any other suitable blockchain and/or NFT standard or architecture.

Figure 4A:
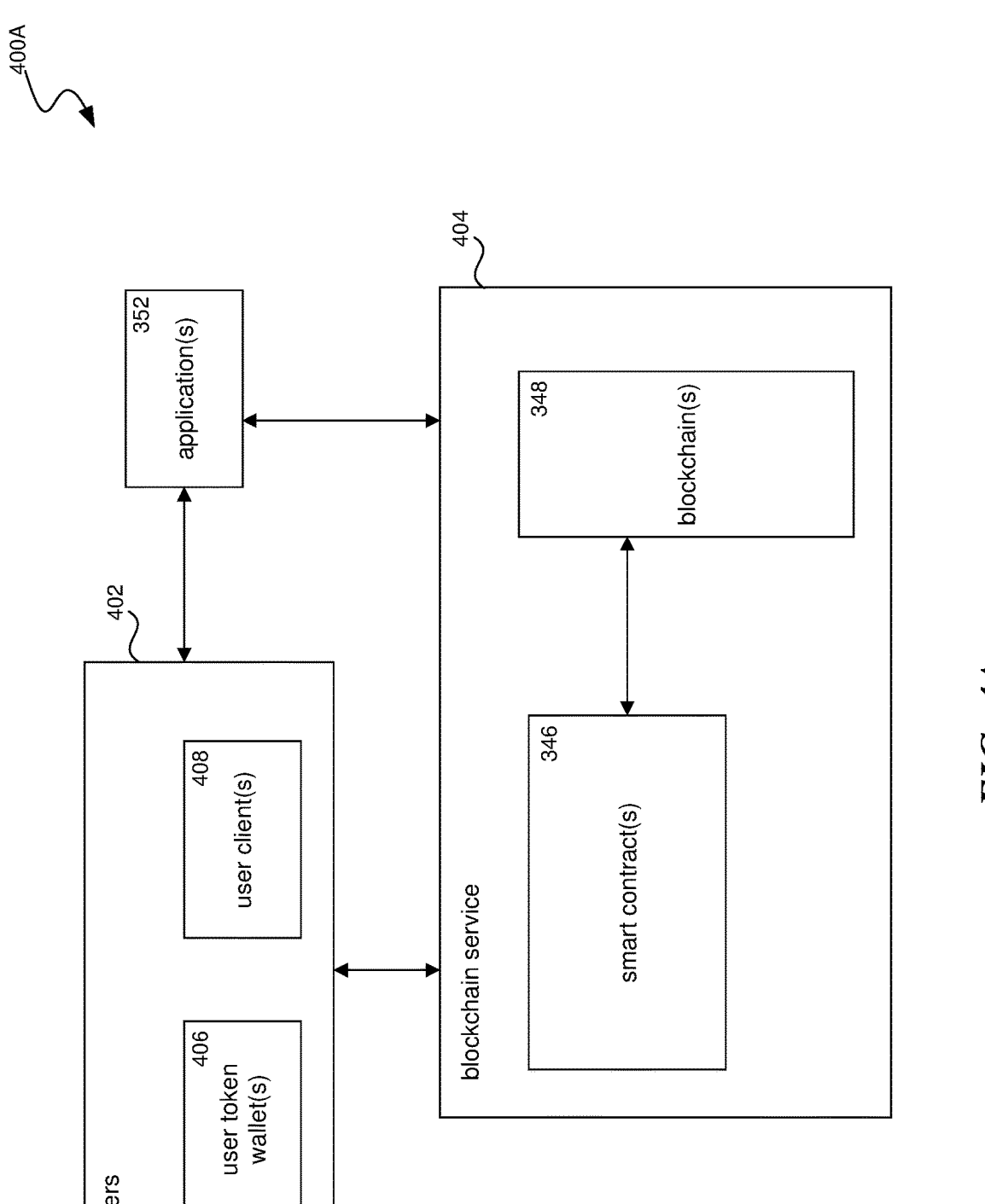
FIG. 4A is conceptual diagram illustrating system components for providing location-based non-fungible tokens (NFTs) using request verification.
Figure 5:
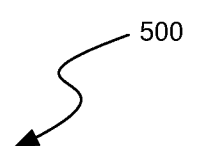
FIG. 5 is a conceptual diagram of a digital collectible affiliated with an NFT.
Figure 5:
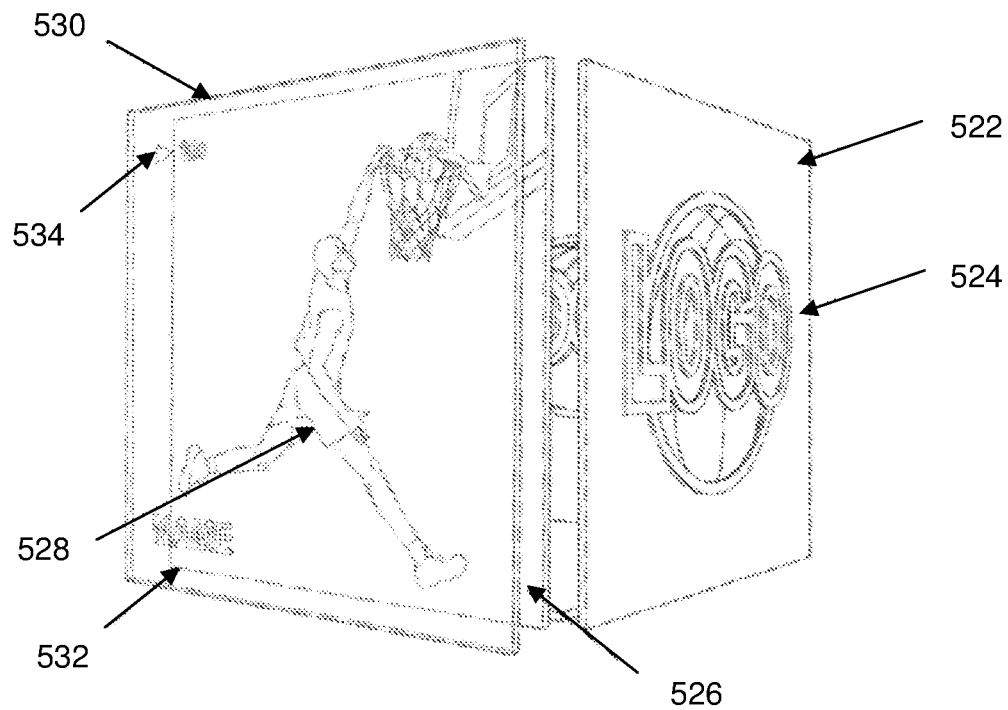

FIG. 4A is conceptual diagram illustrating system components for providing location-based non-fungible tokens (NFTs) using request verification. Diagram 400A includes users 402, blockchain service 404, user token wallet(s) 406, user client(s) 408, smart contracts 346 (discussed above), blockchain(s) 348 (discussed above), and application(s) 352 (discussed above). Application(s) 352 and blockchain service 404 can provide users 402 a digital collectible application service backed by NFTs. In some implementations, application(s) 352 interact with user client(s) 408 to provide users 402 location-based NFTs using location verification.

In some implementations, the digital collectibles comprise features, such as affiliated players, teams, statistical information, media files (e.g., images, videos, etc.) or any other suitable information related to a player. Users 402 can acquire NFTs linked to digital collectibles offered by application(s) 352. For example, application(s) 352 can offer a marketplace of digital collectibles/NFTs that supports transfers among users 402, digital packs of digital collectibles/NFTs that the user can claim (e.g., purchase, win from a contest, etc.), and the like.

Blockchain service 404, smart contract(s) 346, and blockchain(s) 348 implement the transfer of NFTs from one token wallet to another token wallet. For example, execution of one or more smart contract(s) can transfer a NFT (and linked digital collectible) from one of user token wallet(s) 406 to another one of user token wallet(s) 406 and record the transfer at blockchain(s) 348. In another example, a token wallet at application(s) 352 can store minted NFTs, and execution of one or more smart contract(s) can transfer a minted NFT (and linked digital collectible) from a token wallet at application(s) 352 to one of user token wallet(s) 406 and record the transfer at blockchain(s) 348.

User client(s) 408 can comprise a web browser, native application, or any other suitable client application that can display web data to users 402. Application(s) 352 can display web content related to the digital collectible(s) to user 402 via user client(s) 408. Users 402 can interact with user client(s) 408 to manage collections of digital collectibles/NFTs, trade NFTs at the marketplace offered by application(s) 352, acquire new digital collectibles/NFTs, and the like.

In some implementations, users 402 can request location-based NFT(s) from application(s) 352, such as via requests from user clients 408. For example, user clients 408 can execute at a user's portable device (e.g., smartphone, tablet, wearable device, or any other suitable portable computing system) and submit requests for location-based NFT(s) to application(s) 352 from different locations. Application(s) 352 can verify the locations of users 402 and/or the origination location of the users' requests and provide access to location-based NFTs that correspond to the verified locations of the users/users' request.

Figure 4B:
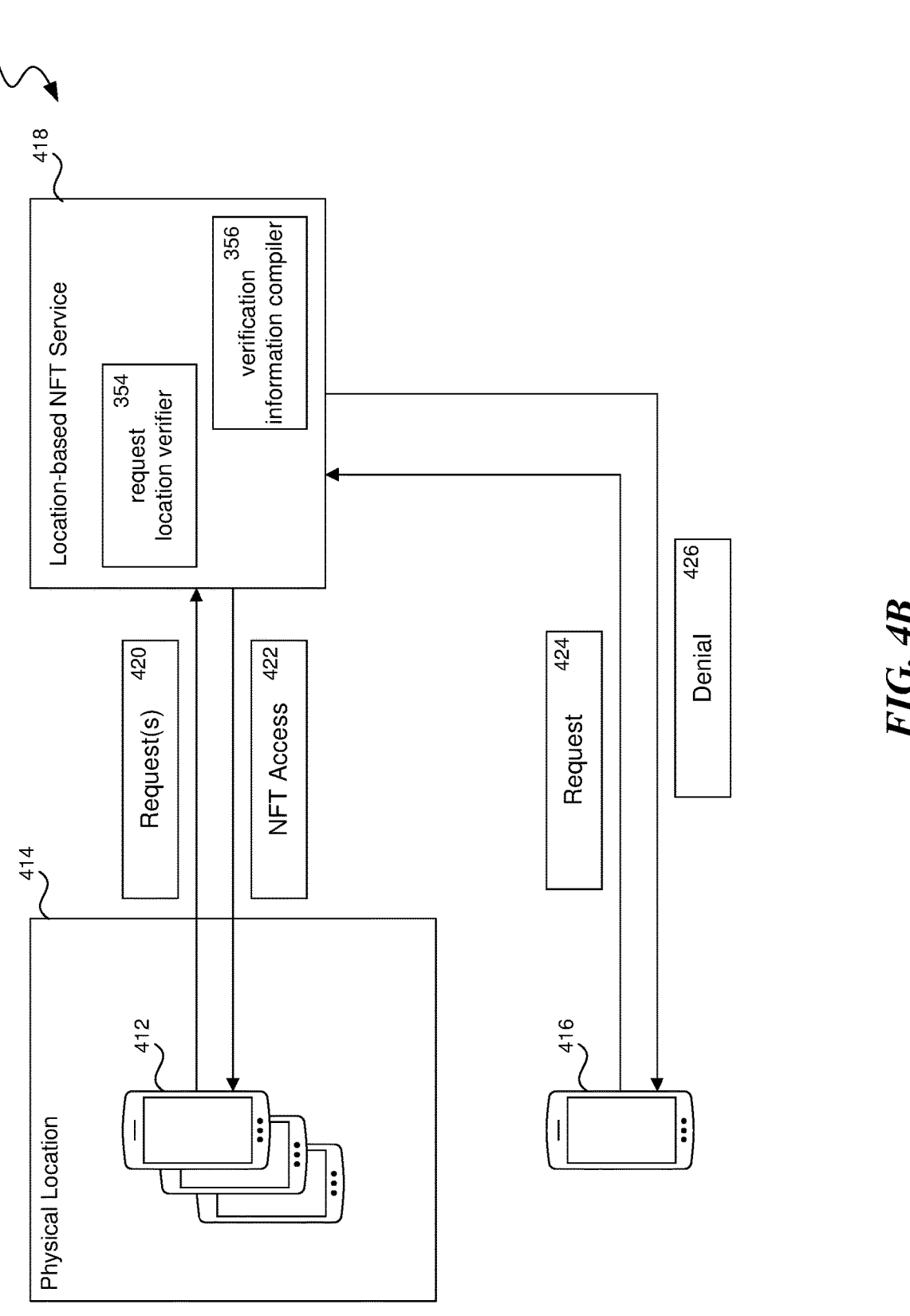
FIG. 4B is conceptual diagram illustrating user systems requesting location-based NFTs from different locations.

FIG. 4B is conceptual diagram illustrating user systems requesting location-based NFTs from different locations. Diagram 400B includes user systems 412, user system 414, physical location 416, location-based NFT service 418, request(s) 420, NFT access grants 422, request 424, denial 426, request location verifier 354 (discussed above), and verification information compiler 356 (discussed above). Physical location 414 can comprise any suitable location that corresponds to location-based NFTs, such as a sporting venue (e.g., stadium, arena, field, etc.), entertainment venue (e.g., stage, theme park, etc.), or any other suitable location.

Physical location 414 can correspond to a predefined location for a set of location-based NFT(s). For example, a set of location-based NFTs may be minted for a sports team with an event at a sporting venue. This set of location-based NFTs can be linked to digital collectibles affiliated with the particular sports team, sporting venue, and/or sporting event. For example, the linked digital collectibles can be affiliated with players that played during the particular sporting event, video clips that represent portions of the particular sporting event, teams participating at the particular sporting event, unique attributes of the particular sporting event (e.g., play-off game, theme of the game, etc.), aspects of the sporting venue, and/or other suitable aspects of the particular sporting event.

Figure 6:
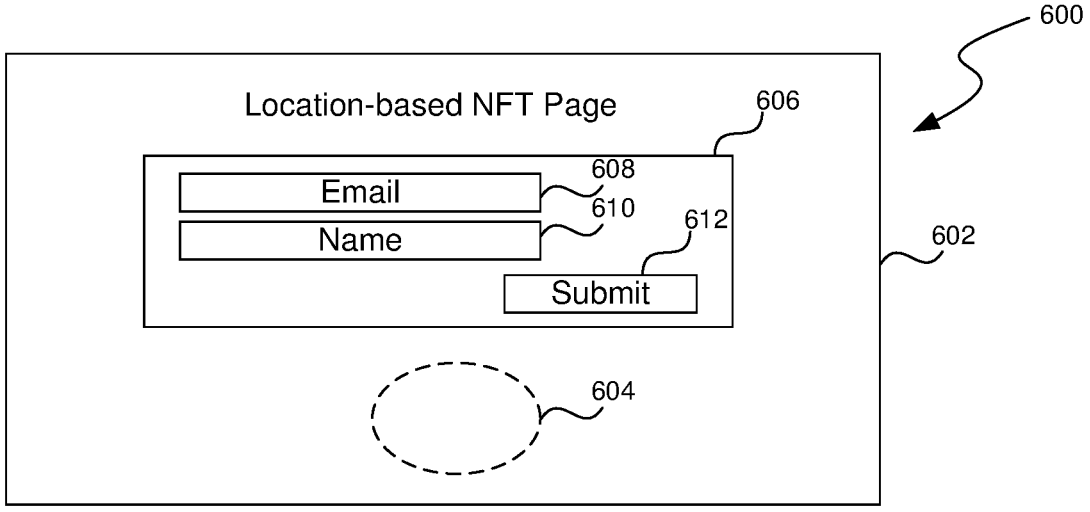
FIG. 6 is a conceptual diagram of a user workflow for requesting a location-based NFT.
Figure 6:
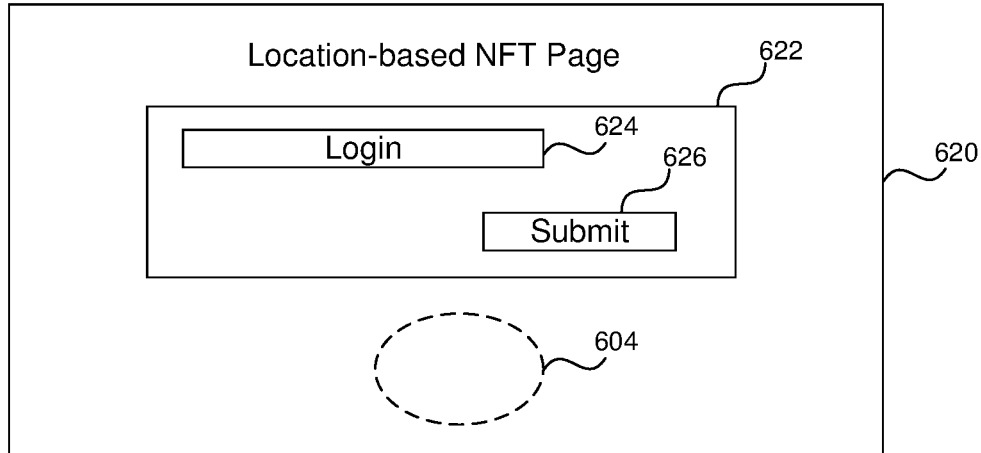
Figure 6:
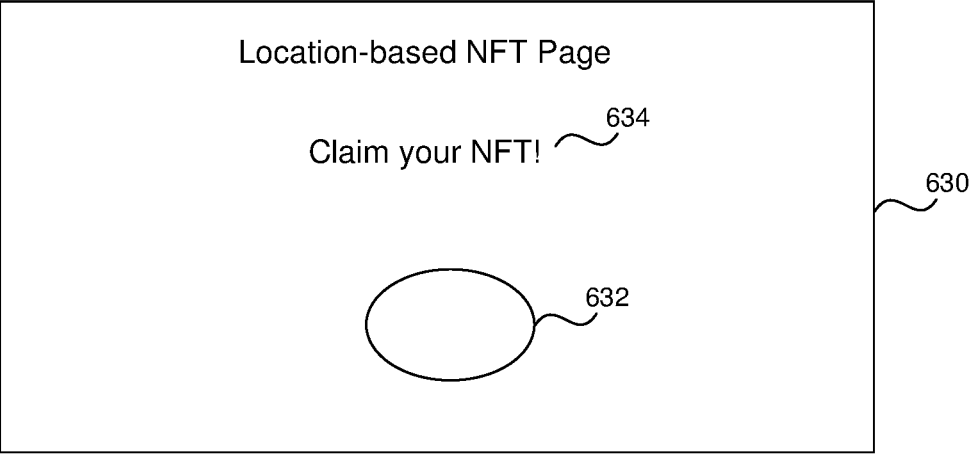

Physical location 414 can be defined as a particular entity (e.g., sporting area, building, theme park, etc.), coordinate(s) of a map (e.g., GPS), or any other suitable location definition. In the illustrated example, user systems 412 can be located at physical location 414 and user system 416 can be located at a different location (not physical location 414). User systems 412 can submit request(s) 420 for location-based NFT(s) to location-based NFT service 418 from physical location 414 and user systems 416 can submit request 424 for location-based NFT(s) to location-based NFT service 418 from a different location. Diagram 600 of FIG. 6 illustrates a user workflow for generating request(s) 420 and/or request 424.

In some implementations, location-based NFT service 418 can comprise several computing components, such as application(s) 352 and/or blockchain service 404 of FIG. 4A. In some implementations, location-based NFT service 418 can perform location verification on request(s) 420 and request 424 using request location verifier 354 and verification information compiler 356. For example, location-based NFT service 418 can derive location information from request(s) 420 and 424, such as network information related to the requests. In some implementations, the network information can include an IP address, MAC address, or any other suitable network identifier. In another example, location-based NFT service 418 can derive location information from user systems 412 and user system 416. For example, the user systems can provide location-based NFT service 418 the Wi-Fi network identifiers that correspond to the Wi-Fi networks that cover the user systems. In some implementations, location-based NFT service 418 can receive additional location information related to user systems 412 and user system 416 from an external location service that identifies a location for the user systems (e.g., city and state, GPS coordinates, etc.).

Request location verifier 354 can compare the network information derived from requests 420 and request 424, the Wi-Fi network identifiers derived from user systems 412 and user system 416, and/or the additional location information from the external location service to one or more location criteria defined for physical location 414. The location criteria can be compiled by verification information compiler 356, for example using historical request(s) for similar location-based NFTs (e.g., affiliated with the same physical location 414), a separate workflow from one or more other entities (e.g., a separate workflow to compile Wi-Fi network identifiers that cover the physical location 414, etc.), a mapping service that provides coordinate for physical location 414, or any other suitable source.

In some implementations, request location verifier 354 can compare network identifiers derived from requests 420 and request 424 (e.g., IP addresses and/or MAC addresses) to location criteria that comprises a list of affiliated network identifiers. In the illustrated example, network identifier(s) derived from requests 420 can be included on the list of affiliated network identifiers (since user systems 412 are located at physical location 414) while network identifier(s) derived from request 424 are not included on the list of affiliated network identifiers (since user systems 416 is not located at physical location 414). In this example, request location verifier 354 can verify requests 420 and return an indication that request 424 is not verified.

In some implementations, request location verifier 354 can compare Wi-Fi network identifiers derived from user systems 412 and user system 416 to location criteria that comprises a list of affiliated Wi-Fi network identifiers. In the illustrated example, Wi-Fi network identifiers derived from user systems 412 can be included on the list of affiliated Wi-Fi network identifiers (since user systems 412 are located at physical location 414) while Wi-Fi network identifiers derived from user system 416 are not included on the list of affiliated Wi-Fi network identifiers (since user systems 416 is not located at physical location 414). In this example, request location verifier 354 can verify requests 420 and return an indication that request 424 is not verified.

In some implementations, request location verifier 354 can compare the additional location information related to user systems 412 and user system 416 from an external location service that identifies a location for the user systems to location criteria that comprises a map location for physical location 414. In the illustrated example, the additional location information for user systems 412 can match the map location for physical location 414 (since user systems 412 are located at physical location 414) while the additional location information for user system 416 may not match the map location for physical location 414 (since user systems 416 is not located at physical location 414). In this example, request location verifier 354 can verify requests 420 and return an indication that request 424 is not verified.

In some implementations, location-based NFT service 418 can also verify that a timing of request(s) 420 and/or request 424 complies with an active time period for a set of location-based NFT(s). For example, a set of location-based NFT(s) can be affiliated with a sporting event (or any other event) that comprises a start time and an end time. The active time period for the location-based NFT(s) affiliated with this sporting event can comprise the start time and an end time for the event, a time relative to the start time and the end time (e.g., a defined number hours before the start time until the end time, such as 2 hours, 4 hours, 24 hours, 48 hours, etc.), the start time and a time relative to the end time (e.g., start time until a defined number of hours after the end time, 2 hours, 4 hours, 24 hours, 48 hours, etc.), any combination thereof, or any other suitable active time period. Location-based NFT service 418 can permit access to request(s) transmitted/received within the active time period (when the locations for these requests are verified) and deny access to requests transmitted/received outside the active time period.

In some implementations, when location-based NFT service 418 verifies the locations for requests/requesting systems and the timing for the requests, access to the location-based NFTs is granted. For example, location-based NFT service 418 can transmit NFT access grants 422 to user systems 412 in response to requests 420 and denial 426 to user system 416 in response to request 424. In some implementations, the users of user systems 412 can claim location-based NFTs via the NFT access grants 422, and the claims can trigger one or more smart contract(s) to deposit one or more location-based NFT(s) into the users' token wallets.

In some implementations, verification information compiler 356 can generate, augment, refine, and/or update location criteria using historical requests and/or past requests for location-based NFTs. For example, historical requests can comprise requests received during past events from physical location 414 (e.g., events on a previous date affiliated with a historical set of location-based NFTs) and past requests can include requests received from physical location 414 proximate to the start of the active time period for the current set of location-based NFT(s). In some implementations, one or more machine learning model(s) (e.g., supervised machine learning models, unsupervised machine learning models, trained machine learning models, etc.) can process these historical/past requests and predict location criteria. For example, machine learning model(s), such as neural networks, can be designed, configured, and/or trained to process request data and derive network identifiers (e.g., IP addresses, MAC addresses, etc.) from the historical/past requests. In some implementations, any other suitable engine and/or processing model can be configured to derive network identifiers from the historical/past requests.

In some implementations, verification information compiler 356 can update the location criteria when a threshold number of past and/or historical requests (e.g., 10, 20, 100, 200, 500, 1000, etc.) comprise a same network identifier (e.g., same IP address, same MAC address, etc.). In some implementations, verification information compiler 356 can remove a given network identifier from the location criteria when no historical request is received that comprises the given network identifier over multiple events at physical location 414. Verification information compiler 356 can update location criteria during an active time period for a set of location-based NFTs, for example based on past requests proximate to the start of the active time period. In this example, first requests that comprise a given network identifier may be denied by location-based NFT service 418 (near the start of the active time period) and second requests that comprise the same given network identifier may be verified by location-based NFT service 418 (later in the active time period) based on an update to the location criteria implemented by verification information compiler 356 during the active time period.

The location-based NFTs can be linked to a set of digital collectibles, and transfer of these location-based NFTs can transfer ownership of the linked digital collectible. Users can therefore claim location-based NFTs and corresponding digital collectibles from the originating source(s) of these NFTs/digital collectibles. FIG. 5 is a conceptual diagram of a digital collectible affiliated with an NFT. Digital collectible 500 is a three-dimensional digital collectible affiliated with a player. The three-dimensional digital collectible can be a virtual n-sided structure (e.g., 3-sided, 4-sided, 6-sided, etc.). Surface(s) of digital collectible 500 can display digital media file(s), such as a moment affiliated with the player. Digital collectible 500 can be a cube, pyramid, octagon, or other three-dimensional shape.

In some implementations, an instance of a digital collectible 500 can be linked to a minted NFT, and ownership of the digital collectible 500 can be passed via ownership of the minted NFT. For example, the owner of the minted NFT can view the digital collectible via an application and user client (e.g., browser, native application, etc.), include the digital collective in collection(s), or interact with the digital collectible in any other suitable manner.

Digital collectible 500 includes several design components that can be altered or removed in some implementations, and one or more additional design components can be added in some implementations. Digital collectible 500 can comprise media file 528, such as an image or video file. Media file 528 can be displayed on one or more sides of digital collectible 500, such as surface 226. In the illustrated example, media file 528 is displayed at surface 226 under glass 530 (e.g., a transparent or semi-transparent layer), which is rendered such that it overlays at a first distance from surface 226. Indicator 534 can indicate the type of media for media file 528, such as a video file that can be displayed/played at digital collectible 500. In some implementations, digital collectible 500 can be affiliated with a player (e.g., via a player identifier) and a team (e.g., via a team identifier). Name 532 can display the name of the affiliated player. In some implementations, name 532 is displayed at glass 530.

In some implementations, digital collectible 500 can be rotated, such as via an animation of the digital collectible and/or in response to user input. Second surface 522 of digital collectible 500 can display any other suitable information about the affiliated team and/or affiliated player. In the illustrated example, second surface 522 displays data 524, or an image of the affiliated team's logo. Data 524 can comprise any suitable media file, information (e.g., statistics about the affiliated player and/or team, data about media file

528, etc.), or any other suitable information. Digital collectibles linked to NFTs in various implementations can be designed in any other suitable manner (e.g., two-dimensional displays, other three-dimensional displays, etc.), include any other suitable data and/or media files, and/or otherwise comprise any other suitable structure.

FIG. 6 is a conceptual diagram of a user workflow for requesting a location-based NFT. Diagram 600 includes user pages 602, 620, and 630. User page 602 comprises inactive claim element 604, page component 606, email element 608, name element 610, and submit button 612. User page 620 comprises inactive claim element 604, page component 622, login element 624, and submit button 612. User page 630 comprises active claim element 632 and verification message 634.

Users, via user client applications (e.g., web browser, native application, etc.) at portable devices (e.g., smartphone, tablet, laptop, wearable system, etc.), can generate request(s) for location-based NFT(s) and/or claim location-based NFT(s) via user pages 602, 620, and 630. For example, a web browser or native application can display user pages 602, 620, and 630 to the users, and the users can interact with the pages to generate request(s) and/or initiate claims. In some implementations, user pages 602, 620, and 630 can comprise web data, such as web pages. User pages 602, 620, and 630 can be affiliated with an NFT service. The NFT service can offer users a set of location-based NFTs that correspond to a predefined location and an active time period. For example, the predefined location can be a sports venue and the active time period can correspond with a sporting event at the sports venue, or extend before and/or after the sporting event.

A user can navigate to user page 602 using an identifier for the page, such as a uniform resource locator, web link, or any other suitable identifier. In some implementations, the user can navigate to user page 602 using: a quick response ("QR") code displayed to the user at the predefined location (e.g., QR code displayed at a sporting venue, such as on a jumbotron, on paper pamphlets handed to attendees, etc.); a URL displayed at the predefined location; a Bluetooth beacon located at the predefined location that pushes messages comprising an identifier for the page; a web link included at another webpage displayed to the user; or any other suitable technique.

User page 602 can comprise an initial page for claiming a location-based NFT that receives identifying information from the user. Page component 606 can include email element 608 and name element 610, where the user can input the user's name and email address. Page component 606 can include any other suitable elements for receiving additional pieces of user information. The user can submit the user information via submit button 612. User page 602 also includes inactive claim element 604, which can be an inactive web page element (e.g., button, link, etc.). After the user submits a request for a location-based NFT, the request is verified, and the user performs a login to the user's account with the NFT service, inactive claim element 604 can be activated NFTs (e.g., illustrated active claim element 632) such that the user can claim one or more of the set of location-based NFTs.

After the user submits the user identifying information via user page 602, the user can be directed to user page 620, which includes page component 622 and login element 624 for logging into the user's account. The user can login via element 624 and submit button 626 using a username and password or any other suitable login flow. Once the user performs the login the NFT service can associate the user with the user's token wallet. At user page 620, the user has not yet completed the login flow, and thus inactive claim element 604 remains inactive.

After user login is complete via user page 620, the user can be directed to user page 630, which includes active claim element 632 and verification message 634. For example, one or more requests generated via the user's navigation of page 602 and/or 620 can be processed by the NFT service, a location for the user request can be verified against a predefined location for the set of location-based NFTs, and a time for the request(s) can be verified against the active time period for the set of location-based NFTs. When the request(s) are successfully verified, verification message 634 can communicate that the user is permitted to claim a location-based NFT and active claim element 632 can be activated such that the user can initiate a claim for one or more of the set of location-based NFTs using the element.

In some implementations, input with respect to active claim element 632 from the logged in user comprises a command that triggers one or more smart contracts to: select one or more of the set of location-based NFTs; and transfer the one or more selected location-based NFTs to the user's token wallet. The user can receive one, two, three, or any other suitable quantity of location-based NFTs in response to a verified request. In some implementations, a given user (and associated token wallet) can be restricted to a certain quantity of the set of location-based NFTs, such as one, two, three, and the like. The one or more smart contract(s) can comprise a condition that limits selection of the quantity of NFTs for the user/token wallet to the restricted number.

In some implementations, a quantity of the set of location-based NFTs can be minted prior to the active time period for the set of location-based NFTs (e.g., prior to the time for the sporting event). The one or more smart contract(s) can select one or more of these pre-minted location-based NFT(s) for the user. In some implementations, the NFT service can mint one or more of the set of location-based NFTs on-demand, such as in response to requests from user client applications and/or in response to verified requests from user client applications.

In some implementations, the quantity of the set of location-based NFTs minted prior to the active time period can be based on an estimated quantity of user claims expected for the set of location-based NFTs. In an example, leftover NFTs from the set of location-based NFTs that are unclaimed after the active time period ends can be burned (e.g., destroyed). In another example, one or more of the set of location-based NFTs can be minted on-demand, for example when claimed NFTs (based on verified user requests) exceed the quantity of location-based NFTs minted prior to the active time period.

In some implementations, before inactive claim element 604 transitions to active claim element 632, the NFT service may prompt the user for a second form of verification information with respect to the predefined location. For example, user page 602, 620, or any other suitable user page may prompt the user to enter an identifier displayed at the predefined location, such as a code displayed via display component (e.g., jumbotron) at the predefined location. The NFT service can verify the code prior to activating active claim element 632 and permitting the user to claim a location-based NFT.

In some implementations, one or more request(s) from a user may be verified by NFT service, however the user may not complete the claim for the location-based NFT (via active claim element 632) at that time. In this example, the user may complete the claim any time before the expiration of the active time period for the set of location-based NFTs. For example, the NFT service can message the user via the user's identifying information (e.g., email) and/or login and permit a claim for a location-based NFT. In some implementations, such a claim may be completed after the user returns home from a sporting even while the active time period for the set of location-based NFTs is still open. While FIG. 6 illustrates an example user workflow for requesting a location-based NFT, any other suitable user pages, user workflow, or technique can be implemented.

Those skilled in the art will appreciate that the components illustrated in FIGS. 1-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
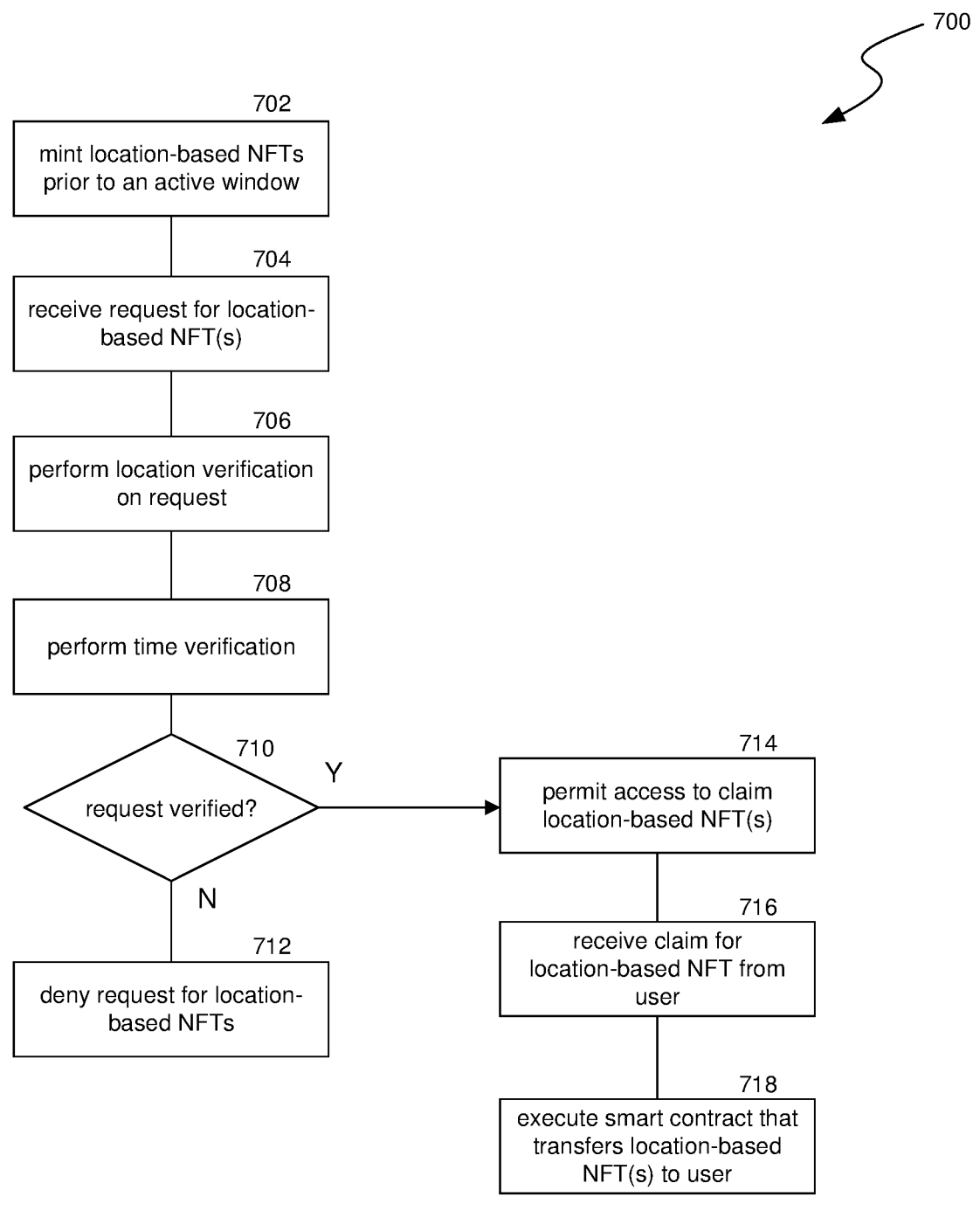
FIG. 7 is a flow diagram illustrating a process used in some implementations for providing location-based non-fungible tokens (NFTs) using request verification.

FIG. 7 is a flow diagram illustrating a process used in some implementations for providing location-based non-fungible tokens (NFTs) using request verification. In some implementations, process 700 can be triggered prior to an active time period for a set of location-based NFTs. Process 700 can be performed by web application(s), user client(s) (e.g., web browser, native application, etc.), blockchain service(s), or any other suitable software components. Process 700 can be performed at a cloud system, edge system, client system, or any combination thereof.

At block 702, process 700 can mint location-based NFTs prior to an active window for a set of location-based NFTs. For example, a set of location-based NFTs can correspond to a predefined location (e.g., a sports venue) and an active time period (e.g., a time period surrounding a sporting event at the sports venue). In advance of the active time period, a quantity of location-based NFTs can be minted. For example, the minted location-based NFTs can comprise a set of location-based NFTs affiliated with the predefined location over the active time period (e.g., sporting event). In some implementations, the quantity of the set of location-based NFTs minted in advance of the active time period can correspond to an estimated number of location-based NFTs user claims over the active time period.

At block 704, process 700 can receive a request for location-based NFT(s). For example, the users, via user client applications at user computing systems (e.g., portable devices), can request one or more NFTs from the set of location-based NFTs. Some users may transmit the requests from the pre-defined location that corresponds to the set of location-based NFTs, and some users may transmit the request from other locations. In addition, some users may transmit the requests during the active time period and some users may transmit the request before or after the active time period.

At block 706, process 700 can perform location verification on the request. For example, location verification can verify that the request originated from the predefined location affiliated with the set of location-based NFTs. Process 800 of FIG. 8 further describes techniques for verifying a user is located in a predefined location affiliated with a set of location-based NFTs. At block 706, process 700 can perform time verification on the request. For example, time verification can verify that the request is received during the active time period for set of location-based NFTs.

At block 710, process 700 can determine whether the request is verified. For example, when the location verification verifies that the request originated from a predefined location affiliated with the set of location-based NFTs and that the request is received during the active time period, the request can be verified and process 700 can progress to block 714. When the location verification does not verify that the request originated from a predefined location affiliated with the set of location-based NFTs and/or that the request is not received during the active time period, the request is not verified and process 700 can progress to block 712, where the request for location-based NFT(s) is denied.

At block 714, process 700 can permit, for each user that corresponds to a verified request, access to claim a predefined quantity of the set of location-based NFT(s). For example, the predefined quantity can include one, two, three, or any other suitable quantity. At block 716, process 700 can receive user claims for the set of location-based NFTs. For example, the users can initiate claims via the client applications at the users' computing systems.

At block 718, process 700 can execute one or more smart contracts that transfer the location-based NFTs to the users' token wallets. For example, one or more smart contracts can, for each user claim, execute to: select one or more of the set of location-based NFTs; and transfer the one or more selected location-based NFTs to the user's token wallet. In some implementations, a quantity of the set of location-based NFTs can be minted prior to the active time period for the set of location-based NFTs. The one or more smart contract(s) can select one or more of the previously minted location-based NFT(s) for each user. In some implementations, the NFT service can mint one or more of the set of location-based NFTs on-demand in response to user claims for the set of location-based NFTs. For example, a portion of the set of location-based NFTs can be minted prior to the active time period, and a second portion of the set of location-based NFTs can be minted on-demand during the active time period in response to received user client requests, user client requests verified to have originated from the predefined physical location, and/or user claims.

Figure 8:
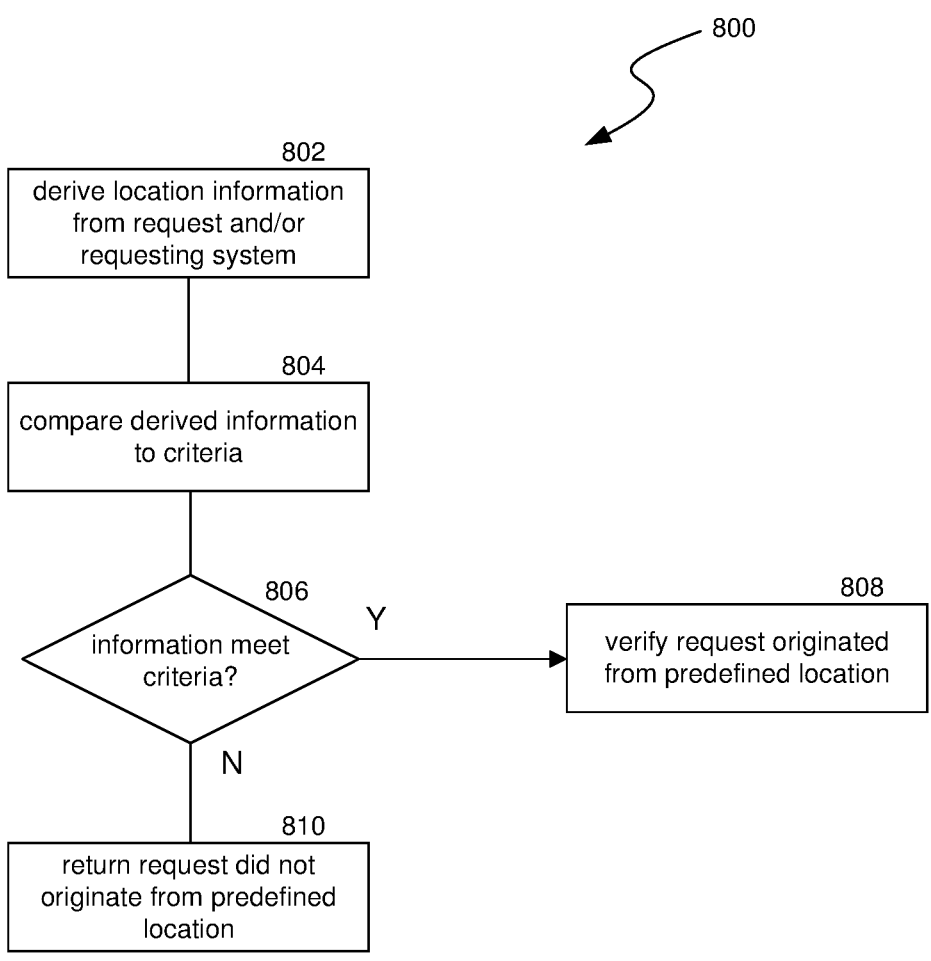
FIG. 8 is a flow diagram illustrating a process used in some implementations for verifying a user is located in a predefined location affiliated with a set of location-based NFTs.

FIG. 8 is a flow diagram illustrating a process used in some implementations for verifying a user is located in a predefined location affiliated with a set of location-based NFTs. In some implementations, process 800 can be triggered when a user, via a requesting user system, requests one or more of a set of location-based NFTs. Process 800 can be performed by web application(s), user client(s) (e.g., web browser, native application, etc.), blockchain service(s), or any other suitable software components. Process 800 can be performed at a cloud system, edge system, client system, or any combination thereof.

At block 802, process 800 can derive location information from the user request and/or the requesting user system. For example, a NFT service can derive location information from a user request, such as network information related to the request. In some implementations, the network information can include an IP address, MAC address, or any other suitable network identifier. In another example, the location-based NFT service can derive location information from the requesting user system. For example, the user systems can provide the NFT service the Wi-Fi network identifiers that correspond to the Wi-Fi networks that cover the user system.

In some implementations, the location-based NFT service can receive additional location information related to the requesting user system from an external location service. For example, the additional location information can define a location for the requesting user system (e.g., city and state, zip code, GPS coordinates, etc.).

At block 804, process 800 can compare the derived information and/or additional information to a location criteria. For example, the NFT service can compare network identifiers derived from the request (e.g., IP address and/or MAC address) to location criteria that comprises a list of network identifiers affiliated with the predefined location. In another example, the NFT service can compare Wi-Fi network identifiers derived from the requesting system to location criteria that comprises a list of Wi-Fi network identifiers affiliated with the predefined location. In another example, the NFT service can compare the additional location information related to the requesting user system to location criteria that comprises a map location for the predefined location (e.g., GPS coordinates).

At block 806, process 800 can determine whether the derived information and/or additional information meets the location criteria. For example, the derived information and/or additional information meet the location criteria when: the network identifiers derived from the request match one or more of the list of network identifiers affiliated with the predefined location; Wi-Fi network identifiers derived from the requesting system match one or more of the list of Wi-Fi network identifiers affiliated with the predefined location; and/or the additional location information related to the requesting user system match the map location for the predefined location.

When the derived information and/or additional information meets the location criteria, process 800 can progress to block 808. When the derived information and/or additional information do not meet the location criteria, process 800 can progress to block 810. At block 808, process 800 can verify that the request originated from the predefined location. At block 810, process 800 can return an indicator that the request did not originate from the predefined location.

In some implementations, the NFT service can generate, augment, refine, and/or update the location criteria using historical requests and/or past requests for location-based NFTs. For example, historical requests can comprise requests received during past events affiliated with the predefined location (e.g., events on a previous date affiliated with a historical set of location-based NFTs) and past requests can include requests received proximate to the start of an active time period for a current set of location-based NFT(s). In some implementations, one or more machine learning model(s) (e.g., supervised machine learning models, unsupervised machine learning models, trained machine learning models, etc.) can process these historical/past requests and predict location criteria. Any other suitable engine and/or processing model can be configured to derive network identifiers from the historical/past requests.

In some implementations, the NFT service can update the location criteria when a threshold number of past and/or historical requests comprise a same network identifier (e.g., same IP address, same MAC address, etc.). The NFT service can update location criteria during an active time period for a set of location-based NFTs, for example based on past requests proximate to the start of the active time period. In this example, first requests that comprise a given network identifier may be denied by the NFT service (near the start of the active time period) and second requests that comprise the same given network identifier may be verified by the NFT service based on an update to the location criteria implemented during the active time period.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for providing location-based non-fungible tokens (NFTs) using request verification, the method comprising:

minting at least a first portion of a set of location-based NFTs, wherein the set of location-based NFTs are associated with an active time period, and wherein the at least the first portion of the set of location-based NFTs are minted prior to the active time period;

receiving, from a client application, a request for one or more NFTs from the set of location-based NFTs;

verifying the request originated from a predefined physical location that corresponds to the set of location-based NFTs by:

comparing one or more network address identifiers from the request to a set of known network address identifiers affiliated with the predefined physical location, wherein, the set of known network address identifiers are compiled, at least in part, using historical requests for another set of location-based NFTs similar to the set of location-based NFTs, and one or more historical network address identifiers are added to the set of known network address identifiers when a threshold number of the historical requests include the one or more historical network address identifiers; and verifying the request when the one or more network address identifiers are included in the set of known network address identifiers;

minting at least a second portion of the set of location-based NFTs on-demand during the active time period in response to received client application requests or verification that client application requests originated from the predefined physical location;

permitting, in response to the verifying that the request originated from the predefined physical location and the request is performed within the active time period, the client application access to claim a predefined quantity of the set of location-based NFTs; and executing, in response to a claim action of a user via the client application, one or more smart contracts that select the predefined quantity of NFTs from among the set of locations based NFTs and transfer the selected NFTs to a token wallet affiliated with the user.

2. The method of claim 1, wherein:

one or more of the set of location-based NFTs are unclaimed after the active time period, and the one or more unclaimed location-based NFTs are automatically destroyed.

3. The method of claim 1, wherein the one or more network address identifiers comprise an internet protocol (IP) address and/or a media access control (MAC) address.

4. The method of claim 1, wherein the set of known network address identifiers is compiled, at least in part, using network identifiers included in an initial set of client application requests for NFTs from the set of location-based NFTs.

5. The method of claim 4, wherein:

the initial set of client application requests for NFTs from the set of location-based NFTs are received proximate to a starting time of the active time period for the set of location-based NFTs.

6. The method of claim 1, further comprising:

compiling at least a portion of the set of known network address identifiers by processing, using one or more machine learning models, an initial set of client application requests for NFTs from the set of location-based NFTs, wherein:

the initial set of client application requests for NFTs from the set of location-based NFTs are received proximate to a starting time of the active time period for the set of location-based NFTs.

7. The method of claim 1, wherein the set of known network address identifiers are affiliated with the predefined physical location.

8. A computer-readable storage medium storing instructions that, when executed by a computing system, cause the computing system to perform a process for providing location-based non-fungible tokens (NFTs) using request verification, the process comprising:

minting at least a first portion of a set of location-based NFTs, wherein the set of location-based NFTs are associated with an active time period, and wherein the at least the first portion of the set of location-based NFTs are minted prior to the active time period;

receiving, from a client application, a request for one or more NFTs from the set of location-based NFTs;

verifying the request originated from a predefined physical location that corresponds to the set of location-based NFTs by:

comparing one or more network address identifiers from the request to a set of known network address identifiers affiliated with the predefined physical location, wherein, the set of known network address identifiers are compiled, at least in part, using historical requests for another set of location-based NFTs similar to the set of location-based NFTs, and one or more historical network address identifiers are added to the set of known network address identifiers when a threshold number of the historical requests include the one or more historical network address identifiers; and verifying the request when the one or more network address identifiers are included in the set of known network address identifiers;

minting at least a second portion of the set of location-based NFTs on-demand during the active time period in response to received client application requests or verification that client application requests originated from the predefined physical location;

permitting, in response to the verifying that the request originated from the predefined physical location and the request is performed within the active time period, the client application access to claim a predefined quantity of the set of location-based NFTs; and executing, in response to a claim action of a user via the client application, one or more smart contracts that select the predefined quantity of NFTs from among the set of locations based NFTs and transfer the selected NFTs to a token wallet affiliated with the user.

9. The computer-readable storage medium of claim 8, wherein:

one or more of the set of location-based NFTs are unclaimed after the active time period, and the one or more unclaimed location-based NFTs are automatically destroyed.

10. The computer-readable storage medium of claim 8, wherein the one or more network address identifiers comprise an internet protocol (IP) address and/or a media access control (MAC) address.

11. The computer-readable storage medium of claim 8, wherein the set of known network address identifiers is compiled, at least in part, using network identifiers included in an initial set of client application requests for NFTs from the set of location-based NFTs.

12. The computer-readable storage medium of claim 11, wherein:

the initial set of client application requests for NFTs from the set of location-based NFTs are received proximate to a starting time of the active time period for the set of location-based NFTs.

13. The computer-readable storage medium of claim 8, wherein the process further comprises:

compiled, at least in part, the set of known network address identifiers by processing, using one or more machine learning models, an initial set of client application requests for NFTs from the set of location-based NFTs, wherein:

the initial set of client application requests for NFTs from the set of location-based NFTs are received proximate to a starting time of the active time period for the set of location-based NFTs.

14. A computing system for providing location-based non-fungible tokens (NFTs) using request verification, the computing system comprising:

one or more processors; and one or more memories storing instructions that, when executed by the one or more processors, cause the computing system to perform a process comprising:

minting at least a first portion of a set of location-based NFTs, wherein the set of location-based NFTs are associated with an active time period, and wherein the at least the first portion of the set of location-based NFTs are minted prior to the active time period;

receiving, from a client application, a request for one or more NFTs from the set of location-based NFTs;

verifying the request originated from a predefined physical location that corresponds to the set of location-based NFTs by:

comparing one or more network address identifiers from the request to a set of known network address identifiers affiliated with the predefined physical location, wherein, the set of known network address identifiers are compiled, at least in part, using historical requests for another set of location-based NFTs similar to the set of location-based NFTs, and one or more historical network address identifiers are added to the set of known network address identifiers when a threshold number of the historical requests include the one or more historical network address identifiers; and verifying the request when the one or more network address identifiers are included in the set of known network address identifiers;

minting at least a second portion of the set of location-based NFTs on-demand during the active time period in response to received client application requests or verification that client application requests originated from the predefined physical location;

permitting, in response to the verifying that the request originated from the predefined physical location and the request is performed within the active time period, the client application access to claim a predefined quantity of the set of location-based NFTs; and executing, in response to a claim action of a user via the client application, one or more smart contracts that select the predefined quantity of NFTs from among the set of locations based NFTs and transfer the selected NFTs to a token wallet affiliated with the user.

15. The method of claim 1, wherein the one or more smart contracts are automatically executed, at least in part, in response to the claim, from the client application, for the predefined quantity of the set of location-based NFTs.

16. The method of claim 1, wherein the one or more network address identifiers from the request comprise a plurality of network identifiers for multiple Wi-Fi networks that cover a user system that originates the request with respect to a time at which the request was originated.

* * * * *